United States Patent
Møller

(10) Patent No.: US 7,396,463 B2
(45) Date of Patent: Jul. 8, 2008

(54) SPIRAL WOUND MEMBRANE ELEMENT AND A PROCESS FOR PREVENTING TELESCOPING OF THE FILTER ELEMENT

(75) Inventor: Jens Kloppenborg Møller, Maribo (DK)

(73) Assignee: Enviro Holding A/S, Copenhagen K (DK)

( * ) Notice: Subject to any disclaimer, the term of this patent is extended or adjusted under 35 U.S.C. 154(b) by 475 days.

(21) Appl. No.: 10/500,649

(22) PCT Filed: Dec. 3, 2002

(86) PCT No.: PCT/DK02/00816

§ 371 (c)(1),
(2), (4) Date: Nov. 10, 2004

(87) PCT Pub. No.: WO03/055580

PCT Pub. Date: Jul. 10, 2003

(65) Prior Publication Data

US 2005/0061730 A1    Mar. 24, 2005

(30) Foreign Application Priority Data

Jan. 4, 2002    (DK) ................................ 2002 00008

(51) Int. Cl.
  *B01D 63/10* (2006.01)
  *B01D 63/12* (2006.01)
  *B01D 61/18* (2006.01)

(52) U.S. Cl. ............. 210/321.74; 210/232; 210/321.83; 210/493.4; 210/497.1; 210/499

(58) Field of Classification Search ................... 210/232, 210/240, 321.74, 321.76, 321.83, 321.85, 210/493.4, 497.1, 499
See application file for complete search history.

(56) References Cited

U.S. PATENT DOCUMENTS

| 4,296,951 A | 10/1981 | Zimmerly |
| 4,301,013 A | 11/1981 | Setti et al. |
| 4,517,085 A | 5/1985 | Edwards et al. |
| 4,855,058 A | 8/1989 | Holland et al. |
| 5,985,146 A * | 11/1999 | Knappe et al. ......... 210/321.83 |
| 6,224,767 B1 | 5/2001 | Fujiwara et al. |

FOREIGN PATENT DOCUMENTS

| EP | 0 188 224 A2 | 8/1986 |
| EP | 1 029 583 A1 | 6/1999 |
| WO | WO96/33798 A1 | 10/1996 |
| WO | WO97/06693 A1 | 2/1997 |
| WO | WO 02 051529 | 4/2002 |

* cited by examiner

*Primary Examiner*—John Kim
(74) *Attorney, Agent, or Firm*—Volpe and Koenig, P.C.

(57) ABSTRACT

A process for ultrafiltration using a spiral wound membrane filter is disclosed where the pressure in the space between the filter element and the pressure vessel is higher than or equal to the pressure inside the filter element. Using these conditions the static force created by the pressure provides a high friction between different sheets in the spiral wound filter element, which efficient prevents unwinding or telescoping of the filter element. Using this configuration it is possible to perform the ultrafiltration using a higher differential pressure across the filter element than would otherwise have been possible which leads to a higher efficiency and a low energy consumption. Further an anti telescoping device (ATD) and a spiral wound filter element, which are particular suited for the disclosed process, are described.

3 Claims, 12 Drawing Sheets

Figure 1:
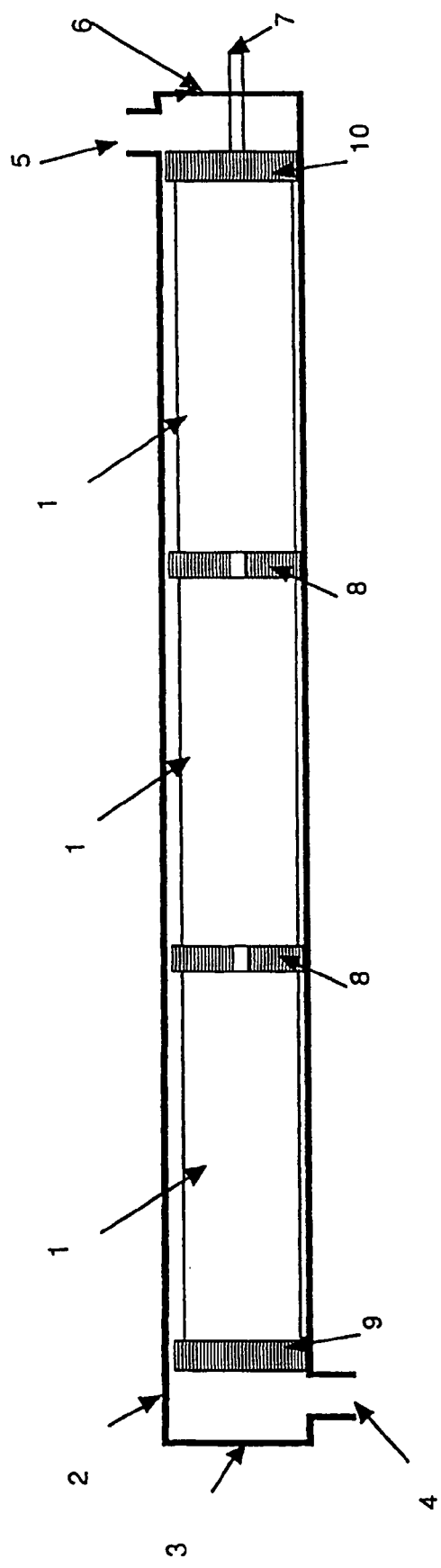

SPIRAL WOUND MEMBRANE ELEMENT AND A PROCESS FOR PREVENTING TELESCOPING OF THE FILTER ELEMENT

The invention relates to an improved method for ultra filtration, an anti telescoping device (ATD) particular suited for use in said method and an ultra filter particular suited for use in said method.

BACKGROUND FOR THE INVENTION

The use of ultra filtration to concentrate a feed stream by passing smaller molecules through the filter, while retaining larger molecules are well known in the industry. Uses of ultrafilters are in particular widespread within the dairy industry and in the pharmaceutical industry. Another well-known use is known as reverse osmosis where essentially all molecules larger that water is retained and the permeate is pure water. Reverse osmosis is used e.g. for desalting seawater in order to produce sweet water for household use or irrigation.

The basis for all these uses is membranes having suitable permeability properties for the intended use. As the throughput obviously is dependent on the surface area of the membrane it is desirable to use large areas of membrane. In order to avoid voluminous process equipment, such membranes are often arranged in a spiral wound configuration.

Typical spiral wound filters consist of 1 to 6 spiral wound elements coupled in a serial flow mode and placed in a cylindrical pressure vessel. Typical spiral wound elements consist of one or more membranes of approximately 1×1 m, wound to a roll having a final diameter of 10-20 cm and a length of approximately 1 m. Between two membranes in the roll is placed a permeable porous medium for conduction of fluid, the concentrate spacer, to ensure that the concentrate can flow over the membrane in order to be distributed all over the surface and to continuously rinse the membrane from accumulating solids.

It is known in the area to provide the filter elements with a hard impermeable shell outside the wound filter element in order to keep the element tightly wound. In this configuration flow in and out of the filter element will be through the ends in an axial direction.

The flow inside the concentrate spacer may be in an axial or a non-axial direction, where the non-axial direction is in a spiralling tangential movement from the outside towards the centre of the wound spiralling element. It is known within the area that some designs of the concentrate spacer allow tangential spiralling movements whereas other designs do not.

Each membrane is typically composed of a porous central conducting medium, the permeate spacer, connected to a central permeate pipe, and on each side of the permeate spacer a separating membrane is provided. The assembly is blocked at the three edges not connected to the permeate pipe e.g. by glue, in order to secure that only fluid penetrating the separating membranes can enter into the permeate spacer.

Often a porous permeable tissue, the trim spacer, is wound around the spiral wound filtration element in order to minimize the space that inevitable occur between the spiral wound element and the pressure vessel.

At each end of the filter elements and in the interspace between two elements when two or more spiral wound elements are present in a cylindrical vessel anti telescoping devices (ATD) are usually provided, which serve as separators between two elements and to reduce the tendency of the spiral wound elements to unwind by telescoping. A number of different designs of ATDs are known within the area.

U.S. Pat. No. 4,296,951 discloses an spheroidal interconnector for filtration modules comprising an molded spheroidal body of elastomeric material having coaxial bores for receiving the respective ends of permeate tubes. These interconnectors are useful at various pressure ranges.

U.S. Pat. No. 4,301,013 discloses a spiral membrane module with controlled by-pass seal, where a material is provided in the space between the exterior surface of the filtration module and the interior surface of the cylindrical vessel in order to prevent accumulation of any product in this compartment.

U.S. Pat. No. 4,855,058 discloses a high recovery spiral wound membrane module comprising means for providing radial flow for the feed-concentrate mixture to an extend sufficient to achieve a conversation of 30% or greater while maintaining turbulent or chopped laminar flow.

U.S. Pat. No. 6,224,767 disclose a fluid separation element assembly where the anti telescoping devises are detachable making them reusable when the membrane elements has reached the end of their efficient life and have to be replaced by new elements.

In use the fluid to be concentrated is forced into the inlet of the pressure vessel and is pressed through the filter elements mainly in the axial direction, even though some filter elements also provide for some flow in the radial direction. However a part of the fluid will pass the filter element through the space between the filter element and the cylindrical vessel creating a by-pass flow.

The person skilled in the art will appreciate that the pressure drop along the filter element is dependent on the flow resistance encountered at the route the liquid travels. Therefore the pressure profile in the space between the filter element and the vessel will be different from the pressure profile at a path inside the spiral wound filter element even though the starting and final pressures are identical, i.e. at some locations the pressure is identical, at some locations the pressure is higher in the space between the filter element and the vessel and at some locations it is lower.

In the locations where the pressure is higher inside the filter element than in the space between the filter element and the vessel there is a tendency of the spiral wound element to unwind or to telescope with the result that channels are formed inside the filter element, which significantly reduces the efficiency of the filter element.

In practice it is experienced that the tendency to unwinding or telescoping increases with higher pressure gradients and flow velocity of the liquid with the consequence that the unwinding or telescoping effect limits the pressure gradient that can be applied to a spiral wound element, and because the pressure difference is the driving force in the filtration operation the efficiency of said filter element is limited.

It is desired to be able to operate spiral wound filter element at higher-pressure gradients in order to enhance the efficiency of the filter element.

SHORT DESCRIPTION OF THE INVENTION

The present inventors has realized that the filtration using a spiral wound ultra filter can be improved by a process for ultrafiltration using one or more spiral would membrane filter elements arranged in a cylindrical pressure vessel, where each filter sections comprises one or more membranes, each consisting of a central permeate spacer covered on both sides by the separating membrane, connected at one edge with a permeate pipe and blocked at the three other edges, wound around the central permeate pipe with a concentrate spacer so the membranes and the concentrate spacers are lying alternating in the wound element and allowing the fluid from the space between the filter element and the pressure vessel entering into the concentrate spacer in a tangential spiralling direction, where in a cross section at any location along the filter element the pressure in the space between the spiral wound membrane filter sections and the cylindrical pressure vessel is higher than or equal to the pressure in the concentrate spacers between two membranes.

In ultrafiltration plants using spiral wound elements according to the prior art the space between the filter element and the pressure vessel will provide a smaller flow resistance than the concentrate spacers inside the wound filter element with the consequence that the linear velocity of the fluid in the space between the filter element and the pressure vessel is higher than inside the wound filter element. The physical laws for fluids as expressed by the Bernoulli equation, teaches that fluids travelling at a higher velocity will exert a smaller static pressure compared with fluids travelling at a lower velocity. Consequently the skilled person will appreciate that in such an ultrafiltration plant according to the prior art the pressure inside the wound filter element will at some positions be higher that the pressure in the space between the wound filter element and the pressure vessel.

In the process according to the invention the pressure creates a force directed from the periphery of the pressure vessel to the centre of the vessel. This force increases the friction between adjacent sheets in the roll, which secures that the spiral wound elements is kept in place without any unwinding and telescoping even when higher pressure than usually is applied to such filter elements.

This enables the filter elements to be operated at pressures significantly higher that the pressures used in the prior art, such as a difference of 2 bar of more between the entrance and the outlet of a filter element having a length of approximately 1 m. Such a high pressure difference provides for a higher efficiency of the filtration element, which again secures that a higher concentrating per area of separating membrane may be achieved using this process and. Further a lower energy consumption compared with processes according to the prior art may be achieved.

Such advantageous pressure may be established by designing the filter in a way so that the passage between the spiral wound element and the pressure vessel is open for incoming fluid at the entrance of the filter element and blocked or restricted at the outlet of the filter element. In this way the pressure will be established according to the process of the invention.

The beneficial pressure conditions according to the invention may be established by use of anti telescoping devices (ATD), comprising an element that when placed in the cylindrical pressure vessel secures that concentrate coming from the preceding filter element or the inlet can not pass the ATD or only pass the ATD in a limited extend at a distance from the central permeate pipe higher than d, where d is smaller that the diameter of the spiral wound membrane filter sections, and where the concentrate streaming out of the preceding filter element is able to flow freely into the space between the following filter element and the pressure vessel.

In a preferred embodiment this ATD is provided with a flow restrictor that secures that the incoming fluid in the following filter element meets the end of the filter element at a lower pressure than said fluid meets the periphery of said filter element.

In another preferred embodiment the filter element used in the process according to the invention is comprising one or more membranes, each consisting of a central permeate spacer covered on both sides by the separating membrane, connected at one edge with a permeate pipe and blocked at the three other edges, wound around the central permeate pipe with a concentrate spacer so that the membranes and the concentrate spacers are lying alternating in the wound element wherein the concentrate can enter into the concentrate spacer in a spiralling tangential direction from the space between the filter sections and the cylindrical pressure vessel.

SHORT DESCRIPTION OF THE DRAWINGS

FIG. 1. Schematic presentation of an ultra filter consisting of three spiral wound filter elements (1), a cylindrical pressure vessel (2), an inlet (4), an outlet for concentrate (5) and an outlet for permeate (7), an inlet ATD (9), two intermediate ATDs (8) and an outlet ATD (10).

Figure 2:
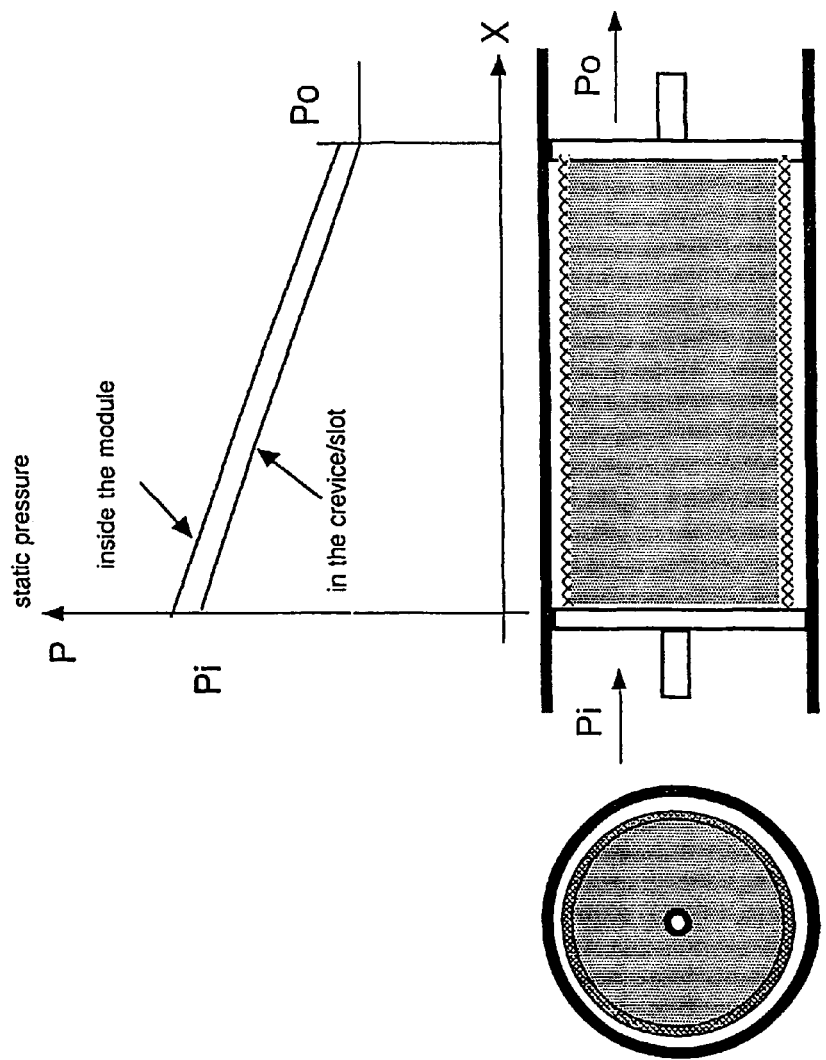

FIG. 2. is a diagram showing the pressure profile of a typical prior art ultra filter where Pi is the inlet pressure, Po is the outlet pressure, and X is the distance from the start of the spiral wound pressure element.

Figure 3:
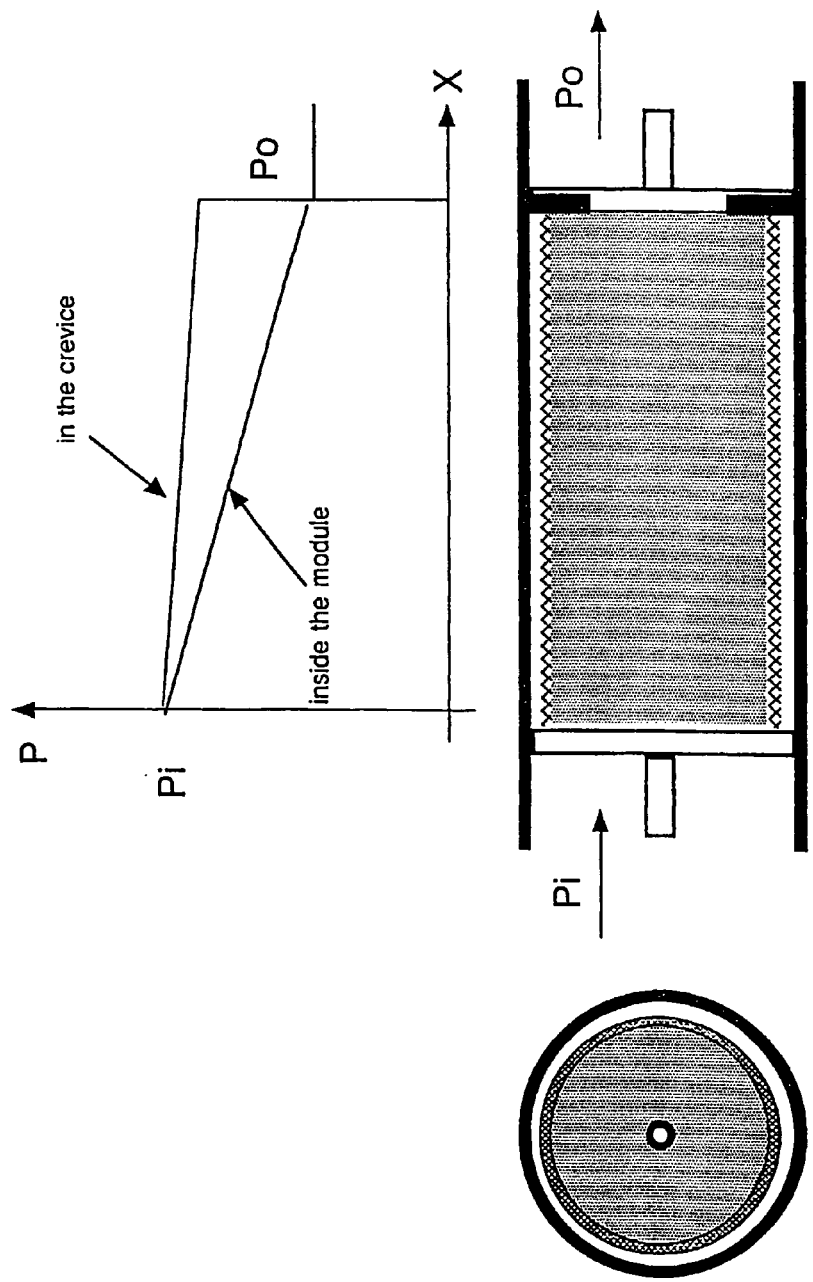

FIG. 3. is a diagram showing the pressure profile in a spiral wound module according to the invention.

Figure 4:
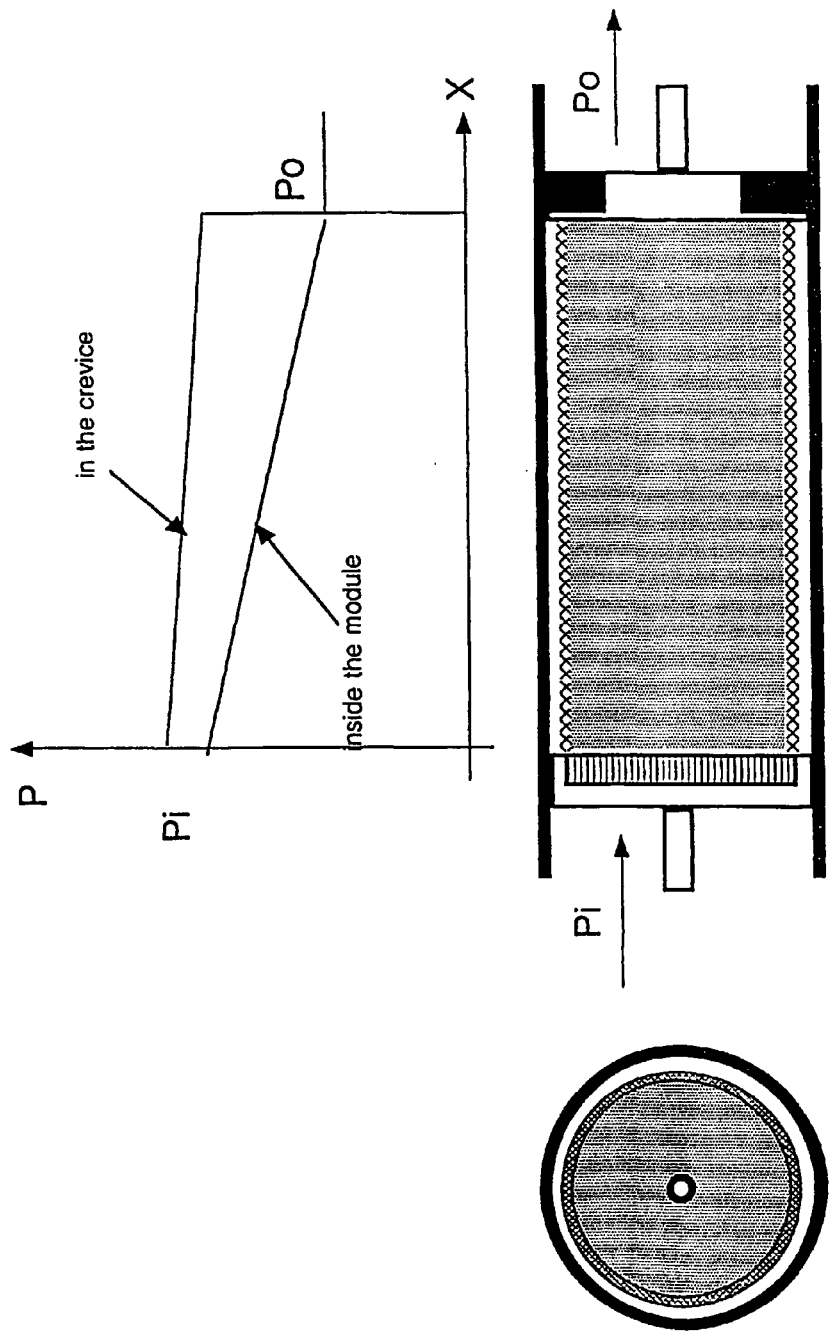

FIG. 4. is a diagram showing the pressure profile in a spiral wound module having a flow restrictor inserted before the inlet end of the spiral wound element.

Figure 5:
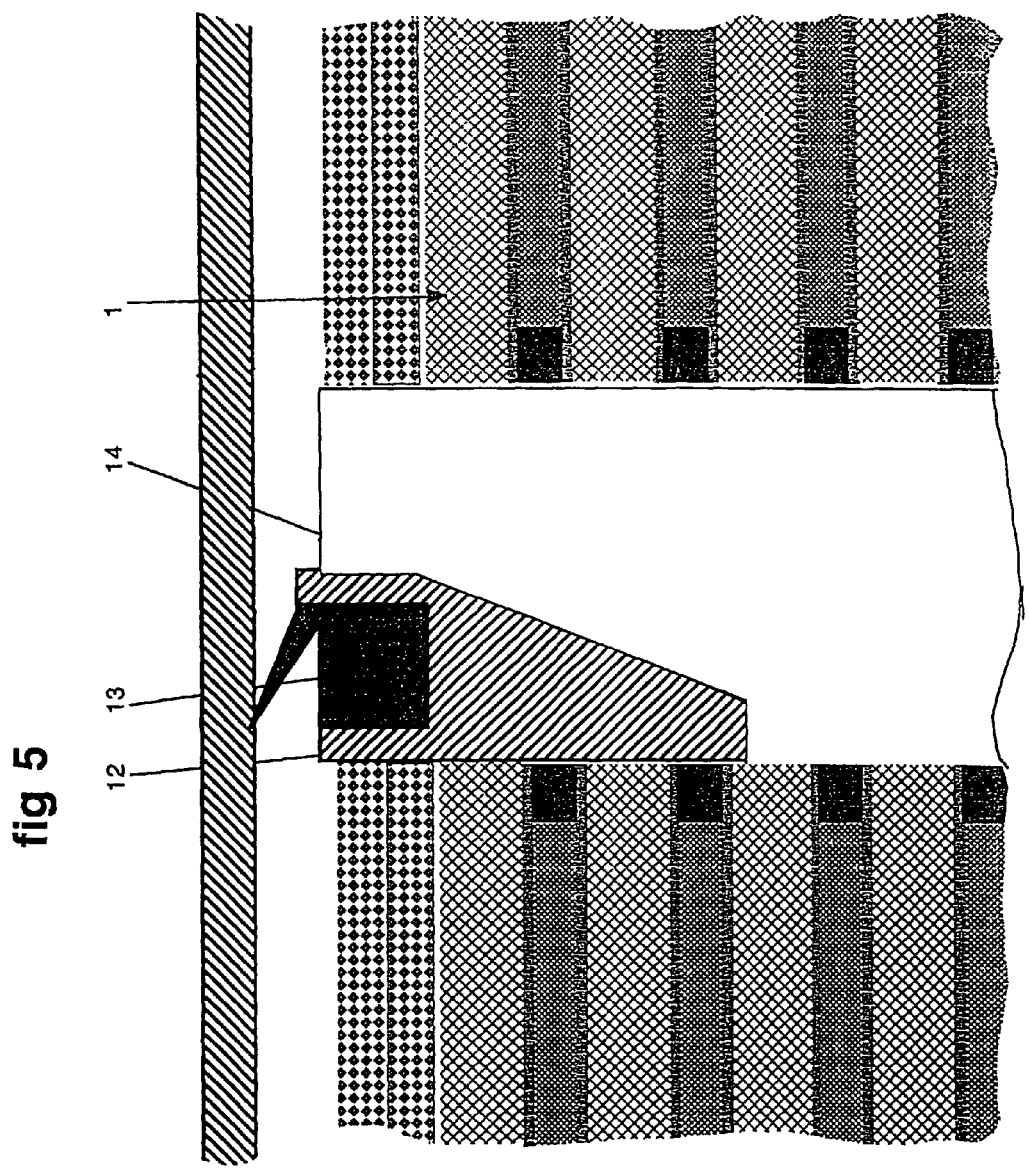

FIG. 5. is a cross section of one embodiment of the ATD according to the invention, showing a cross section between the central permeate pipe (not shown) and the pressure vessel (2). A ring (12) seals off the flow in the outer part of the filter provided with a lip-seal (13) sealing off to the vessel and an opening (14) that allows the feed/concentrate to enter into the space between the following spiral wound element and the pressure vessel.

Figure 6:
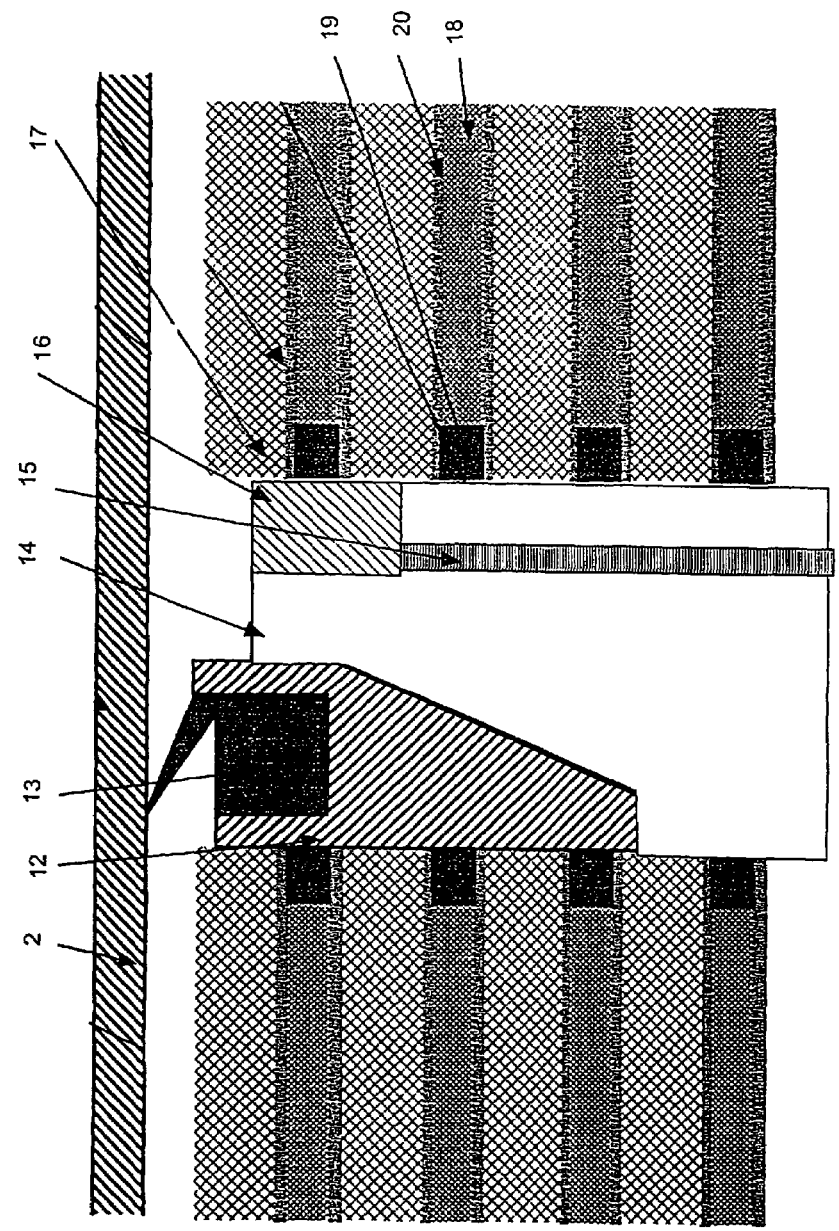

FIG. 6. shows another embodiment of the ATD according to the invention further provided with a flow restrictor (15) and a ring (16) abutting to the outer part of the following filter element sealing off between the flow restrictor (15) and the opening (14).

Figure 7:
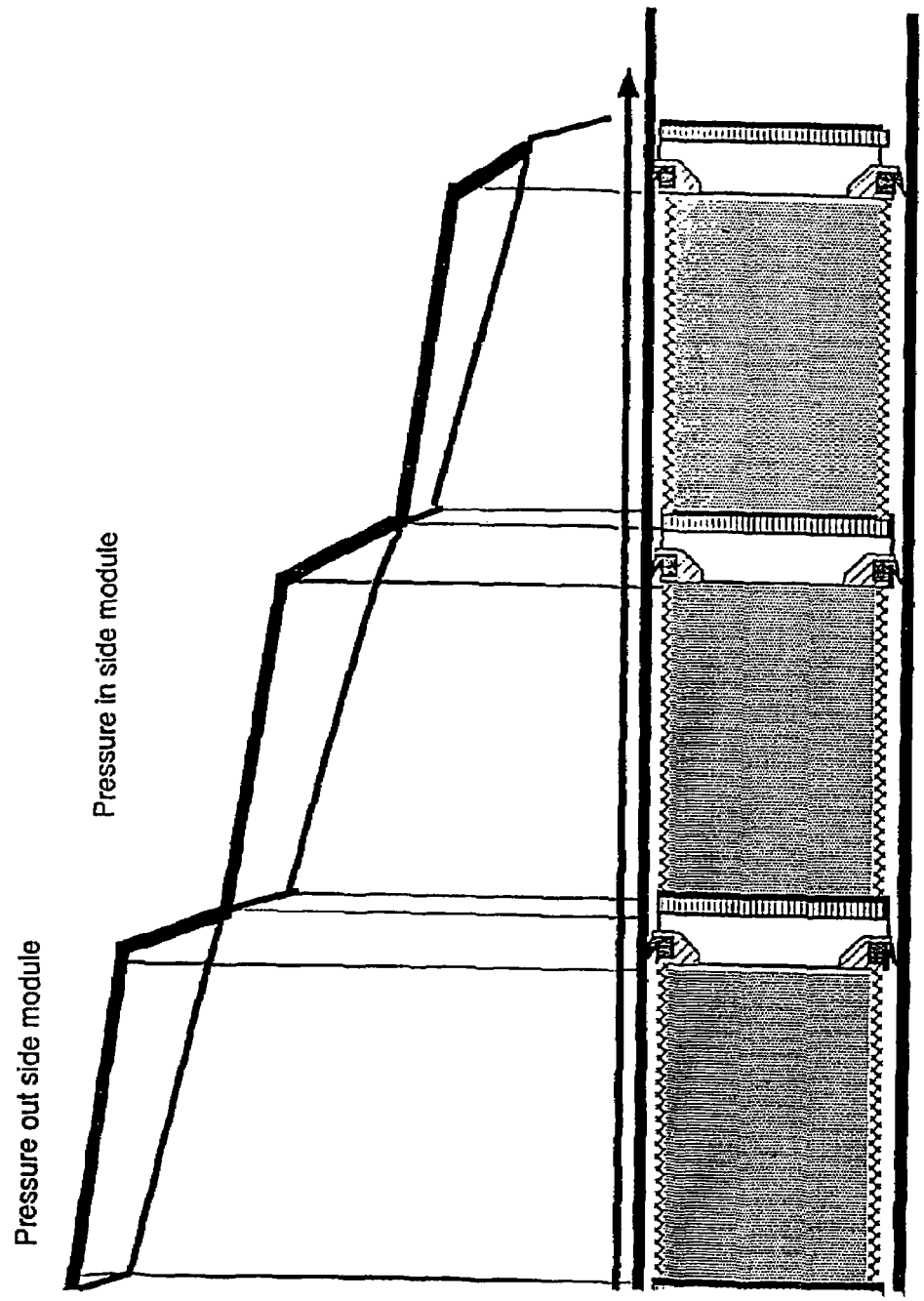

FIG. 7. is a schematic presentation of the pressure profile along a filter having three spiral wound filter elements separated by ATD's according to the invention provided with flow restrictors.

Figure 8:
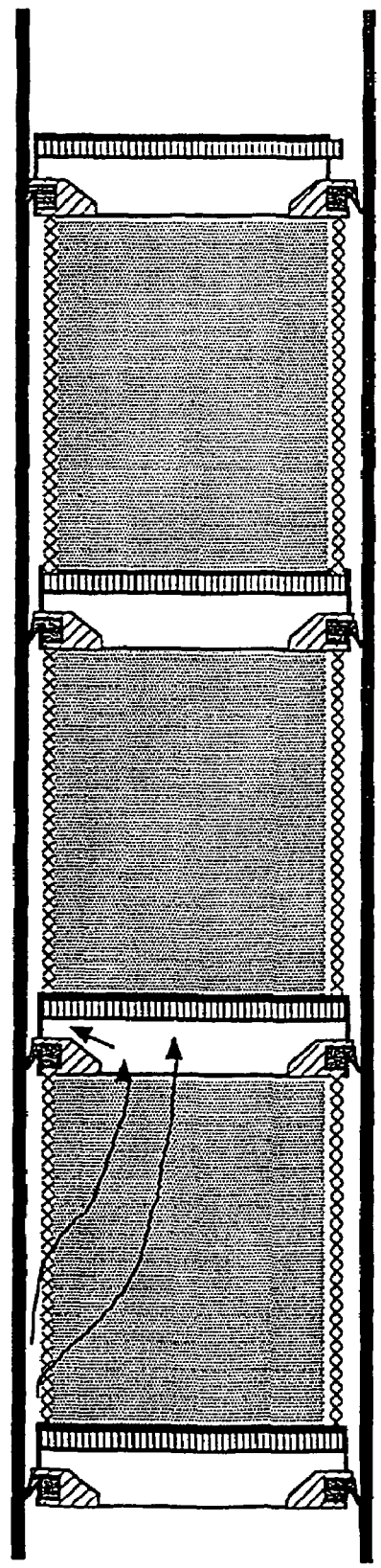

FIG. 8. shows the flow of concentrate in the filter similar to the one described in FIG. 7.

Figure 9:
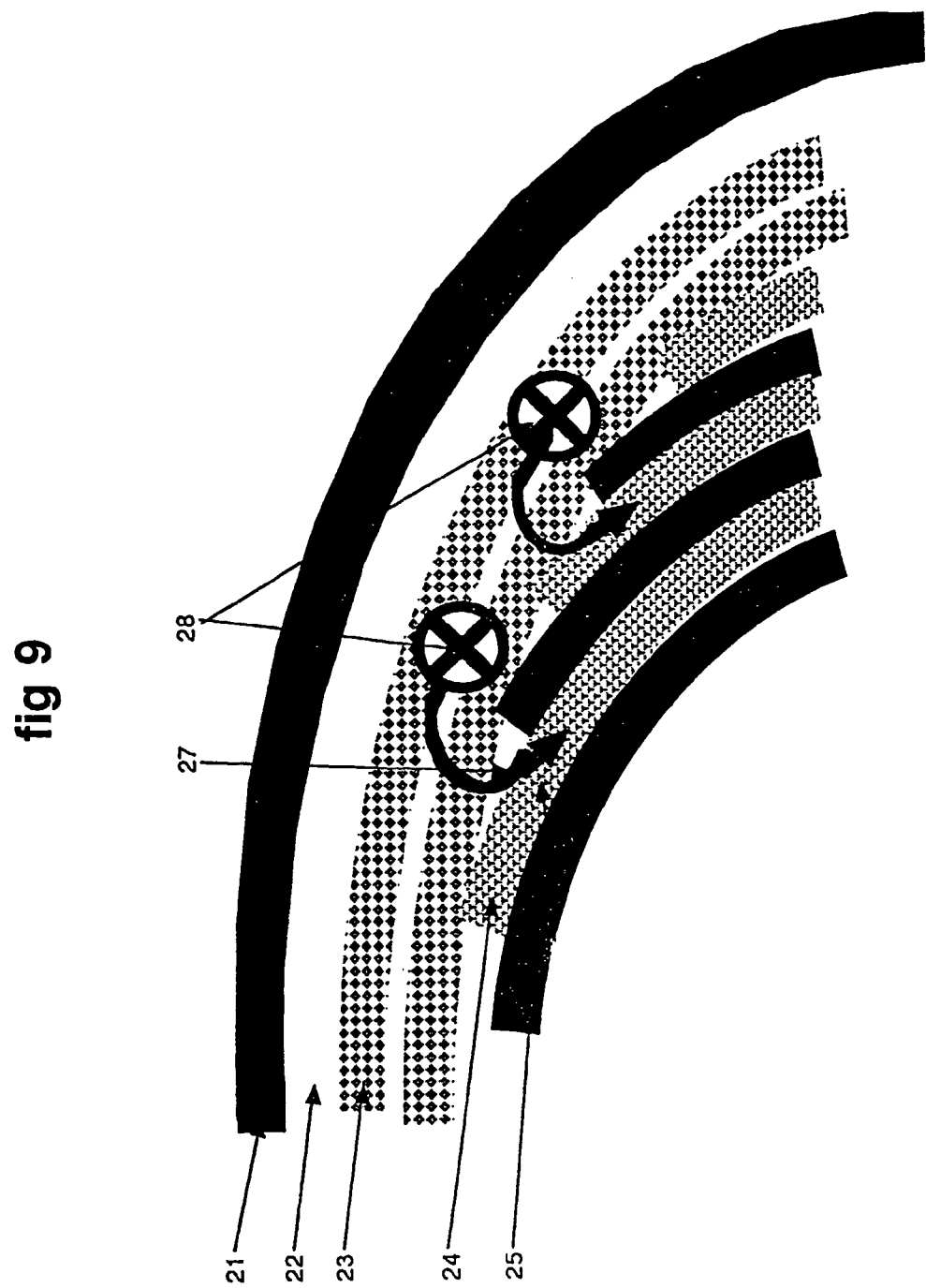

FIG. 9. shows a cross section of a spiral wound filter where (21) is the pressure vessel, (22) is the space between the filter and the pressure vessel, (23) is a permeable tissue surrounding the filter element, (24) is a concentrate spacer, (25) is a filter membrane, and the arrows (27-28) show the flow of liquid tangentially into the concentrate spacer (24) of the spiral wound element.

Figure 10:
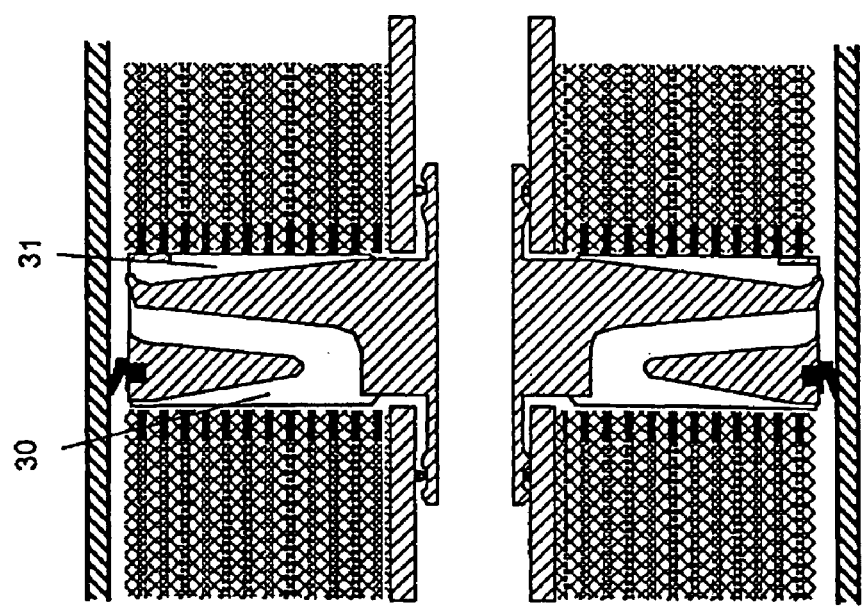

FIG. 10, shows an embodiment of the ATD according to the invention where the compartment (30) receiving the outlet from the preceding spiral wound element is formed so the flow resistance is increasing with the distance from the centre of the element, and the compartment (31) from where the inlet to the following element is formed so the flow resistance is decreasing with the distance from the centre of the element.

Figure 11:
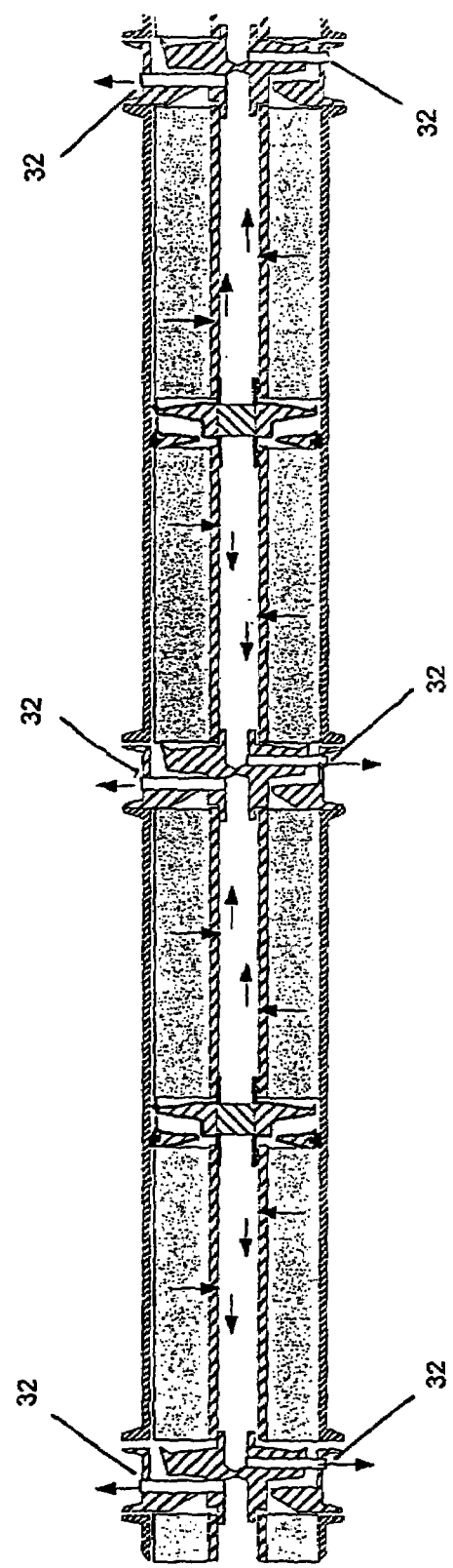

FIG. 11, shows a filtration unit comprising four spiral wound filtration elements separated by ATD according to another embodiment of the invention, with indications of the flow inside the unit. In this embodiment the permeate in the central permeate tube can not pass the ATD, but is withdrawn by permeate outlets (32) provided in every second ATD. By providing suitable counter pressure at the outlets it is possible to adjust the net driving pressure of each filtration element.

Figure 12:
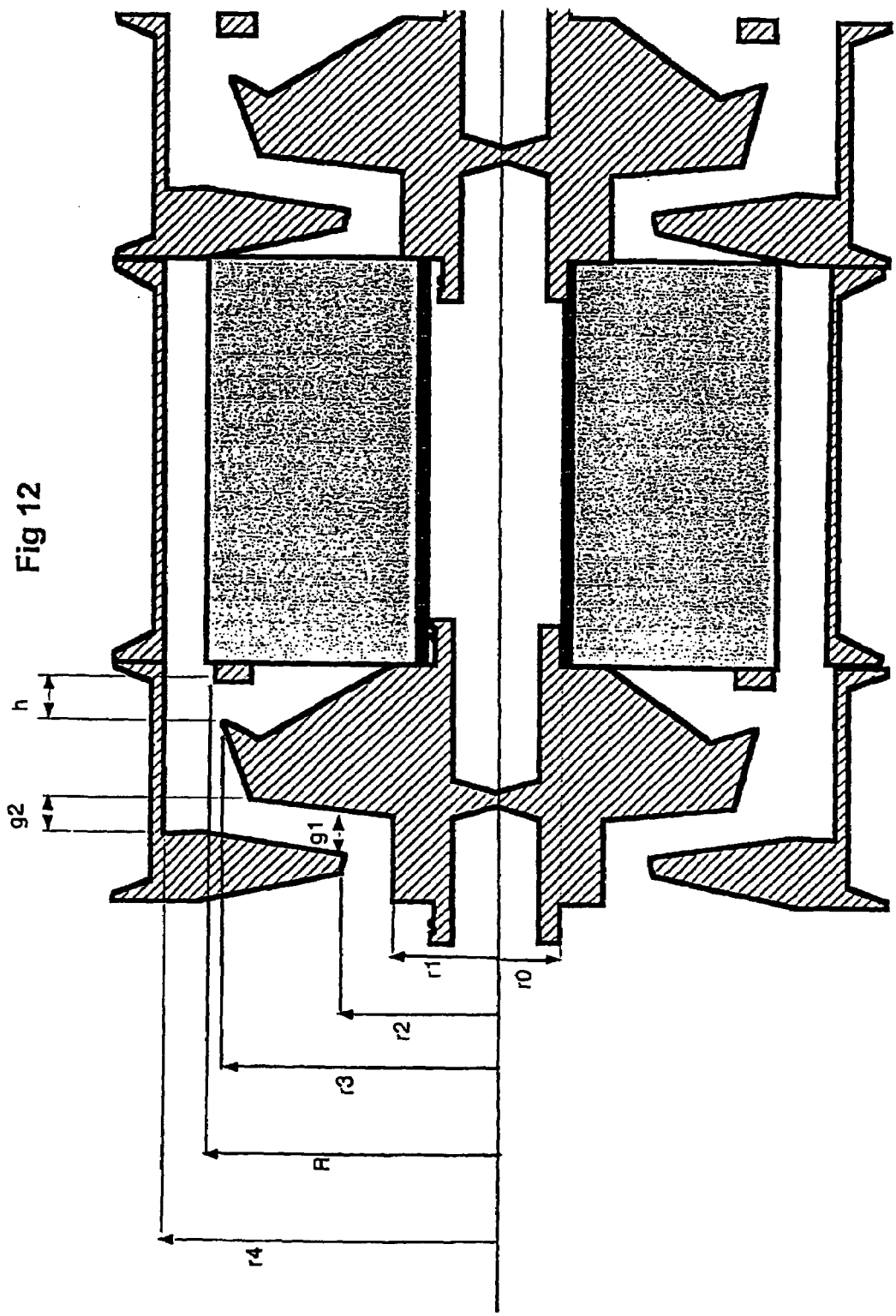

FIG. 12, shows a schematic cross section of the filtration unit used in the examples.

DETAILED DESCRIPTION OF THE INVENTION

The present invention is related to ultra filtration where the ultrafilter is comprising one or more spiral wound elements contained in a cylindrical pressure vessel, where a incoming fluid comprising one or more dissolved compounds is concentrated with the simultaneously creation of a permeate comprising the low molecular components of the incoming fluid. Different terms may be used for such separations performed using such a spiral wound filter in a pressure vessel depending on the actual cut off value of the particular membrane in question such as ultra filtration, micro filtration and reverse osmosis. The person skilled in the art will appreciate that the present invention is not restricted to any particular of these terms or to membranes having cut-off values in a particular range, but the invention may be used with any of these separations, even though the description is mainly explained in relation to ultra filtration.

Spiral wound elements as such are well known within the area. The invention may in principle be performed using any spiral wound filtration element having separating membranes and concentrate spacers wound around a central permeate pipe, which spiral wound elements allow tangential entry into the concentrate spacer from the space between the filter element and the pressure vessel.

Membranes for use in spiral wound elements consist of a central sheet, the permeate spacer, receiving and transporting permeate to the central permeate pipe. On each side of the permeate spacer is attached a separating membrane, and this assembly is blocked at the edges e.g. by glue in order to secure that the only fluid entering into the permeate spacer is entering through the separating membranes and can only escape form the permeate spacer via the unblocked edge and is thereby led into the central permeate pipe. The separating membrane may be selected having a cut-off value that is suitable for the intended use.

The cut-off value should in this description be understood in the usual way as the highest molecular weight that a compound able to penetrate the membrane may have.

Spiral wound elements are made by winding the membranes attached to the central permeate pipe around said pipe. Between two membranes in the spiral wound elements are inserted a sheet, the concentrate spacer, for transport of the incoming fluid being increasingly more concentrated as the low molecular components pass through the membranes.

The function of the permeate spacers and the concentrate spacers is to keep the spacing in where they are placed open for conduit of liquid at the intended pressure of operation.

Spiral wound elements; membranes and spacers well known within the prior art may be used in performing the present invention.

In order to distinguish different positions in an ultra filtration filter or at a spiral wound filter element the term "preceding" is to be understood as closer to the inlet, whereas the term "following" is to be understood as closer to the outlet for concentrate.

During mounting of spiral wound elements in pressure vessels a space between the spiral wound element and the pressure vessel inevitable occur. In this description this space is also termed the slot.

The filtration according to the invention is performed by securing that in a cross section of the pressure vessel at any position the pressure in the slot is higher than or equal to the pressure in a concentrate spacer inside the spiral wound element. This pressure distribution reduces the tendency of the spiral wound element to unwind or telescope during operation. Using this particular pressure distribution in the filter it is possible to operate spiral wound filter elements at a higher pressure difference across a filter element than would have been possible if the pressure distribution was different. By use of a higher pressure difference across the filter element the pressure across the membranes increases which leads to a higher throughput per square area of separating membrane present in the filter element. Obviously this is advantageous because the capacity of the filter is increased resulting in a decreased need for investments for equipment. Further the process may be performed having low energy consumption.

In principle the maximal pressure difference between the inlet and the outlet of the ultra filter or the spiral wound filter elements may be determined by the compressibility of the wound membrane and spacers. The person skilled in the art will appreciate that the spacers used in a filter element in order to be sufficient porous may be compressed under a high mechanical burden. It is not desired to compress any components of the spiral wound filter because compression may create altered conducting properties. Therefore the pressure difference between the inlet and the outlet should be selected so no compression of the membranes and the spacers occur.

In use, the pressure difference between the inlet and the outlet of a filtration element is higher than approximately 1 bar per meter filtration element, preferable in the range of 1-5 bar/m, more preferred in the range of 1.5-3 bar/m and most preferred approximately 2 bar/m.

The pressure in the slot is preferably at least 0.01 bar higher that the pressure inside the filtration element.

A pressure in the slot higher than or equal to the pressure inside the module at a transverse cross-section may be provided by securing that the fluid can enter into the slot from the inlet side but not flow out of the slot in the outlet side of the filter element or only flow out of the slot at the outlet side of the filter element at a limited extend. In this way a higher pressure compared to the inner parts of the filtration element is created in the slot.

The expression "in a limited extend" is intended to mean that a small flow out of the slot is allowed in an amount sufficient to prevent formation of dead pockets without flow of liquid anywhere in the filtration unit but sufficient low to secure that essentially all the fluid passes through the filter. The skilled person will appreciate that in sanitary systems e.g. for use in the food or pharmaceutical industry it is crucial that no dead pockets are present because such dead pockets may allow establishment micro organisms which obviously is unacceptable.

Flow in a limited extend may be provided by arranging a flow resistance at the outlet of the slot such as a narrow passage for the fluid, e.g. holes in the sealing.

The flow in a spiral wound filter element operated according to the invention is indicated in FIG. 8.

Without wishing to be bound by the theory it is believed that the higher pressure in the slot than inside the spiral wound element creates a force on the membranes directed towards the centre of the element which force secures that the friction between different sheets in the spiral wound element is increased and consequently the tendency to lateral movements between sheets are reduced resulting in a reduced tendency to unwinding or telescoping.

In FIG. 2 a diagram of the pressure in the slot and inside the element is shown for a filter element operated according to the prior art. As it appears from FIG. 2, the pressure in the slot is at several positions along the filter element higher than or equal to the pressure inside the module. Therefore a static outwards force is created which reduces the friction between different sheets of the element.

Contrary in filter elements operated according to the invention, where the pressures are indicated in FIG. 3, the static force created by differences in pressure between different compartments is directed to the centre of the pressure vessel which will increase the friction between adjacent sheets in the spiral wound filter and will therefore prevent movement of one sheet in respect of the adjacent sheet and prevent unwinding of the element. In the end of the filter element proximal to the inlet there are essentially no pressure difference between the slot and the inside of the element is found, whereas the difference increases along the length of the element.

In one embodiment a flow restrictor is placed in front of the spiral wound element in a way so that fluid can flow into the slot beside the flow restrictor. The flow restrictor serves to secure that the pressure in the proximal part of the filter element is below the pressure in the slot at the particular place.

The properties of the flow restriction is selected so a sufficient pressure difference is created between the entrance of the filter element and the pressure in the slot in a position corresponding to the end of the filter element most proximal to the inlet. Preferably said difference is larger that 0.01 bar, more preferred in the range of 0.05 to 0.1 bar.

The flow restrictor may be made of any material capable of restricting the flow to the proximal end of the filter element and sufficient strong to endure the pressure. It is within the skills of the person skilled in the art to determine which materials are suitable for such a flow restrictor.

With use of a flow restrictor the pressure profile of a filter element will be as indicated in FIG. 4.

At each end of the filter element and if more than one filter element is provided in a pressure vessel between two filter elements ATDs are placed. An ATD that is particular suited for use according to the present invention is an anti telescoping device (ATD) for separating two spiral wound membrane filter sections in an ultrafiltration unit according to the invention, comprising an element that when placed in the cylindrical pressure vessel secures that concentrate coming from the inlet or the preceding filter element can not or only in a limited extend pass the ATD at a distance from the central permeate pipe longer than d, where d is smaller that the diameter of the spiral wound membrane filter elements, whereas concentrate coming from the preceding filter element freely can flow into the slot between the following filter element and the pressure vessel.

This design secures that the fluid can not or only in a limited extend flow from the slot between the preceding filter element into the interspace between two elements, and simultaneously can fluid flow from said interspace into the slot between the following filter element and the pressure vessel. Arranged in this way the ATD according to the invention secures the beneficial pressure distribution in the process according to the invention.

The distance d is selected so that the ratio between d and the radius of the pressure vessel is in the range of 0.4 to 0.95, preferably in the range of 0.75 to 0.95, and most preferred in the range of 0.8 to 0.9.

Passage of fluid in a limited extend may also be regarded as a controlled bypass of fluid. It may be beneficial to have a controlled bypass in order to secure that fluid is flowing in all parts of the filtration unit and that no "dead pockets" without movement of fluid can appear. This is in particular important in applications within the food or pharmaceutical industries where bacterial growth may establish in dead pockets and therefore must dead pockets be avoided in these applications of sanitary reasons.

In one embodiment the ATD may be provided with means for sealing to the pressure vessel. Such means for sealing are well known within the area. Examples of such means for sealing can be selected from lip sealings and O-rings.

In another preferred embodiment the ATD may be provided with flow resistance for the fluid flowing out of the preceding filter element, where the flow resistance is increasing with the distance from the centre of the filtration element. Similar the ATD may be designed so that resistance for the fluid flowing into the following filtration element is decreasing with the distance from the centre of the filter element. These varying flow resistances secure that the pressure inside the filtration element is increasing with the distance from the centre of the filter element.

Varying flow resistance may be provided by designing the ATD in a way so that the compartment from which the fluid flows in (31) or out (30) is wedge shaped, where the highest flow resistance is at the point of the wedge.

In a preferred embodiment the ATD is further provided with a ring abutting on the outer part of the following filter element so that the fluid is unable to enter into the outer concentrate spacers, but able to enter into the inner concentrate spacers and also able to unhindered to flow into the following slot.

The ring abutting on the following filter element preferably has a dimension so it is able to block inflow into the filter element in a distance Dr from the outer surface of the filter where the ratio between Dr and the radius of the pressure vessel is in the range of 0.7 to 0.9.

The ATD is further provided with structures to establish a sufficient face of contact with the preceding and following filter elements in order to be able to withstand the pressure applied without unacceptable deformation of the filter elements or the ATD. In this connection unacceptable deformation is to be understood as a deformation that significantly reduced the lifetime or efficiency of the filter elements. Suitable structures designed to provide said face of contact may be selected among radial ribs, rings, perforated plates etc, as it will be known within the area.

In another preferred embodiment of the invention the ATD is designed in a way so that the permeate in the central permeate tube can not pass the ATD, but instead ATDs are provided with permeate outlets (32). In this way the central permeate is divided into segments each spanning from one ATD to another ATD and each segment provided with a separate outlet. By providing a suitable counter pressure at each permeate outlet it is possible to adjust the net driving pressure, i.e. the pressure difference between the inlet of said filtration element and the permeate outlet of said filtration element, across the separating membranes of each spiral wound filtration element. This is particular advantageous for filtration units containing several spiral wound filtration elements in order to secure that the net driving pressure is essentially identical across each spiral wound filtration element. Each ATD may be provided with one permeate outlet or every second ATD may be provided with two permeate outlets one at each side as indicated in FIG. 11.

It is within the skills of the person skilled in the art to select suitable dimensions and materials for the ATD's.

In one embodiment the ATD comprise a flow restrictor connected to the ATD in a way that secures that fluid entering the following filter element must pass this flow restrictor but fluid can freely flow into the slot between the following filter element and the pressure vessel without passing the flow restrictor.

The flow restrictor secures that the pressure in the slot is higher than the pressure inside the filter elements at all positions along the filter element.

In the present invention it is preferred that the filter elements are made in such a way that the concentrate can enter into the concentrate spacer in a spiralling tangential direction from the space between the filter sections and the cylindrical pressure vessel.

This secures that the fluid in the slots is flowing into the filter elements as schematically shown in FIG. 9.

Flow of liquid into the filter in a tangentially direction further introduces a circulating flow in the slots which again secures that no dead pockets without movement of fluid is present in the pressure vessel. Further the circulating flow secures that no deposits are formed in the slots, which is imperative for use in industries where a high hygienic standard is required.

One preferred way to provide for the fluid being able to enter into the filter in a tangentially direction is to design the filter element so that the membranes are not protruding over the concentrate space. More preferred, the concentrate spacer is protruding from the separating membranes (FIG. 9).

Because the process according to the invention to a large extend eliminates the problem of telescoping the process may be performed under conditions mainly determined by the properties of the used membranes and the product to be processed in the ultra filter.

However, it is preferred that the process is performed under a pressure difference in the range of 0.5-5 bar/m and a temperature of 1-100° C.

The process according to the invention may in principle be used in any industry where ultrafiltrations are used in order to concentrate or fractionate aqueous solutions. In particular the process may be performed within the dairy industry, the pharmaceutical industry and the biotechnological industry.

In one preferred embodiment the process according to the invention is used for concentration of a proteinaceous substance in an aqueous medium. A particular preferred aqueous medium is milk or whey.

EXAMPLES

An arrangement according to FIG. 12 was used for filtrations, where the dimensions and streams were as indicated in the table below. The terms in the table are as indicated in FIG. 12.

|  |  | ex 1 | ex 2 | ex 3 | ex 4 |
|---|---|---|---|---|---|
| r0 | mm | 14 | 14 | 14 | 14 |
| r1 | mm | 18 | 18 | 18 | 18 |
| r2 | mm | 55 | 45 | 35 | 26.5 |
| r3 | mm | 75 | 75 | 77 | 79 |
| R | mm | 80 | 80 | 80 | 80 |
| r4 | mm | 100 | 85 | 82.5 | 81.5 |
| g1 | mm | 16 | 19 | 13 | 7 |
| g2 | mm | 12 | 11.5 | 6 | 2.4 |
| h | mm | 3 | 5.5 | 3 | 1.2 |
| r4-R | mm | 20 | 5 | 2.5 | 1.5 |
| A(r1, r2) | mm² | 8485 | 5344 | 2830 | 1188 |
| A(r2, g1) | mm² | 5529 | 5372 | 2859 | 1165 |
| A(r3, g2) | mm² | 5655 | 5419 | 2903 | 1191 |
| A(r3, h) | mm² | 1414 | 2592 | 1451 | 596 |
| A(r4, R) | mm² | 10053 | 2513 | 1257 | 754 |

-continued

|  |  | ex 1 | ex 2 | ex 3 | ex 4 |
|---|---|---|---|---|---|
| A(r3, r4) | mm² | 13744 | 5026 | 2756 | 1261 |
| Qfeed | m³/h | 25 | 25 | 17 | 17 |
| axial/radial flow |  | 0.50 | 0.50 | 0.50 | 0.50 |
| radial flow Qr | m³/h | 12.5 | 12.5 | 8.5 | 8.5 |
| Axial flow Qa | m³/h | 12.5 | 12.5 | 8.5 | 8.5 |
| v(r1, r2) | m/s | 0.82 | 1.30 | 1.67 | 3.97 |
| v(r2, g1) | m/s | 1.26 | 1.29 | 1.65 | 4.05 |
| v(r3, g2) | m/s | 1.23 | 1.28 | 1.63 | 3.96 |
| v(r3, r4) | m/s | 0.51 | 1.38 | 1.71 | 3.75 |
| v(r3, h) | m/s | 2.46 | 1.34 | 1.63 | 3.96 |
| v(r4, R) | m/s | 0.96 | 1.34 | 1.85 | 3.10 |

In the table the expression A(r1,r2) is intended to mean the area between the r1 and r2. Similar the expression v(r1,r2) is intended to mean the velocity of the stream passing between r1 and r2. Other expressions are to be understood similarly.

In all the tested examples the filtrations were performed well without any undesired unwinding or telescoping of the filter element.

The invention claimed is:

1. Filter assembly for ultrafiltration comprising in a pressure vessel one or more filter elements with antitelescoping devices (ATD) located upstreams and downstreams for each filter element, wherein the filter elements comprises one or more membranes, each consisting of a central permeate spacer covered on both sides by separating membranes, connected at one edge with a permeate pipe and blocked at the three other edges, wound around a central permeate pipe with a concentrate spacer allowing fluid from the space between the wound filter element and the pressure vessel to flow into the wound filter element in a direction tangential to the cross-section of the filter element, so that the membranes and concentrate spacers are lying alternating in the wound element; wherein the inlet to the space between the wound filter element and the pressure vessel is free of obstruction and the outlet from said space is restricted so that no flow or only a limited flow is allowed from said space to the space between the respective wound filter element and the pressure vessel, characterized in that, the wound filter elements are provided with means for securing that the pressure inside retentate channels of the filter element is equal to or lower than the pressure in the space between the filter element and the pressure vessel at the same longitudinal position over the whole length of the filter element, and wherein means for securing that the pressure at the inlet of the filter element is equal to or lower than the pressure in the space between the filter element and the pressure vessel at the same longitudinal position is a flow restrictor placed at an inlet to a spiral wound filter element.

2. Filter assembly according to claim 1, wherein the ATD is formed having a ring abutting to the outlet side of the wound filter element preventing fluid flowing out from the filter element in a distance from the central permeate pipe higher than d, where d is a distance smaller than the radius of the spiral wound membrane element.

3. Filter assembly according to claim 1, wherein the flow restrictor is made in one piece with the ATD.

\* \* \* \* \*